May 16, 1950

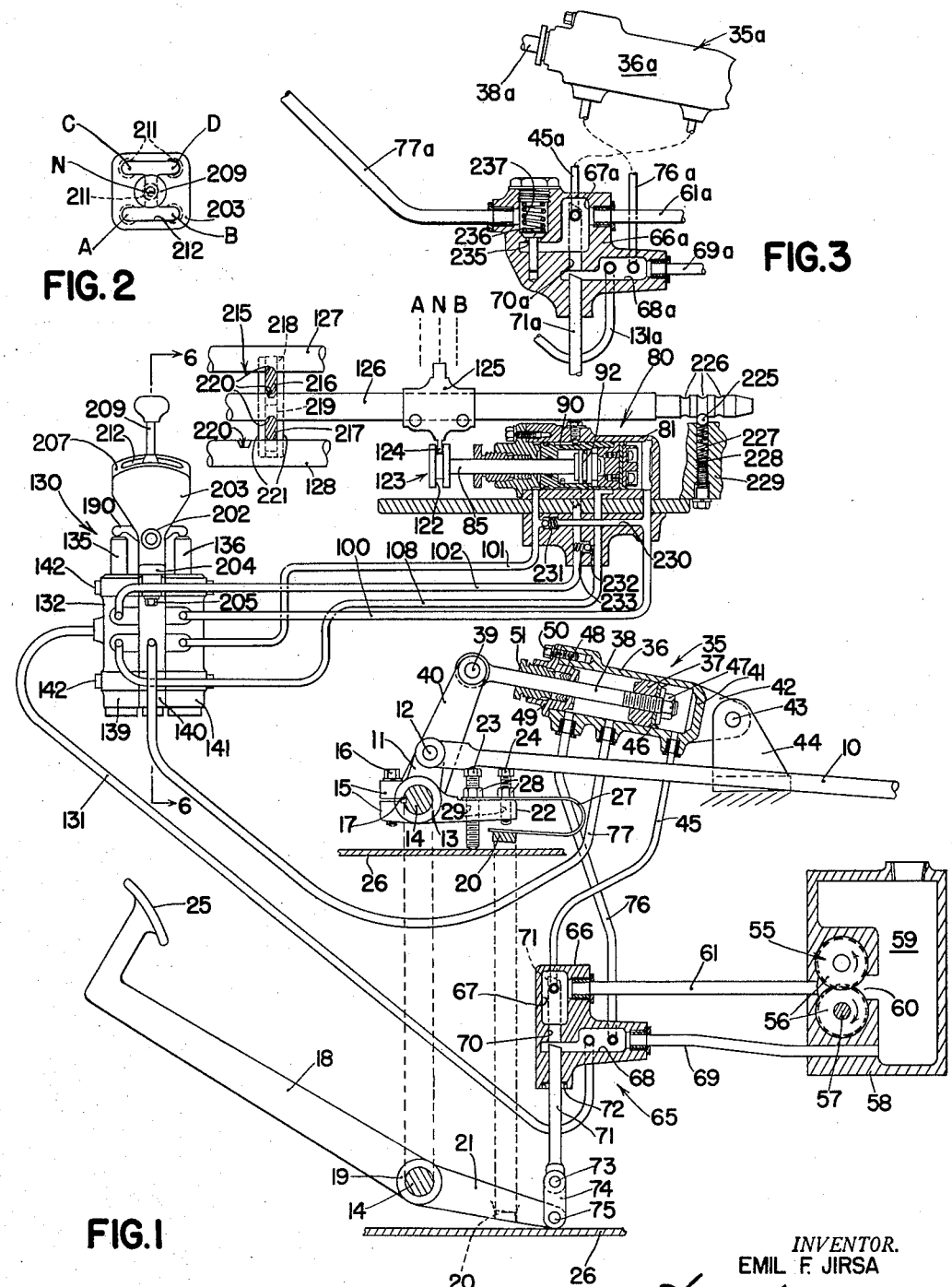

E. F. JIRSA 2,508,263

FLUID PRESSURE CONTROL MECHANISM

Filed Dec. 17, 1943

*INVENTOR.*
EMIL F. JIRSA

BY

ATTORNEYS

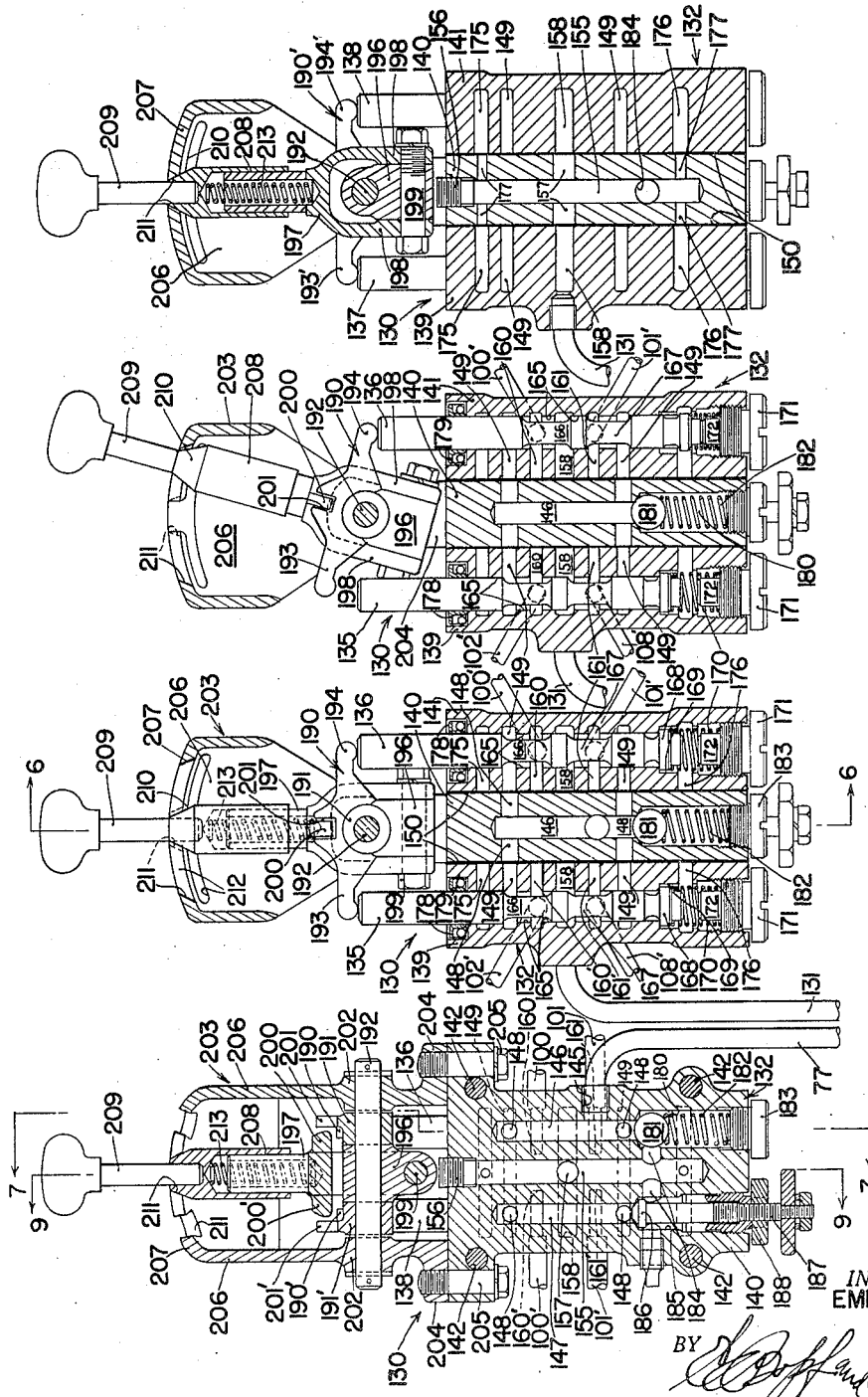

Patented May 16, 1950

2,508,263

UNITED STATES PATENT OFFICE 2,508,263

FLUID PRESSURE CONTROL MECHANISM

Emil F. Jirsa, Waterloo, Iowa, assignor to Deere Manufacturing Co., a corporation of Iowa Application December 17, 1943, Serial No. 514,703

2 Claims. (Cl. 74—471)

The present invention relates generally to fluid pressure control mechanisms and more particularly to mechanisms of this type adapted to control the clutch and gear shift mechanisms on heavy vehicles such as trucks, busses, tanks, tractors, and the like. In vehicles of this class, the clutch and gear shift, when operated entirely by hand, require so much effort on the part of the driver that he rapidly becomes fatigued and furthermore prevents him from devoting his undivided attention to the control of the vehicle, particularly under driving conditions which require frequent gear changes.

The principal object of my invention relates to the provision of a power actuated control mechanism, which actuates both clutch and gear shift devices by power transmitted from the vehicle engine or by means of an independently operated electric motor for the oil pump, the motor being energized from the storage battery, requiring practically no physical exertion on the part of the operator, but which is simple and durable, and which is controlled in the same manner and with the same motions required by hand-operated mechanisms for the same purpose. A system of the type to be disclosed herein, does not require any additional period of instruction for the operator and can be controlled by any individual who is familiar with the operation of an ordinary automobile.

More specifically, one of the objects of the present invention relates to the provision of a power actuated clutch and gear shift control mechanism in which the gear combination is pre-selected by means of a selector control lever when the actuation of the mechanism is initiated by a slight pressure on the clutch pedal. A related object is directed to a clutch actuating device operable by power from the tractor under control of the usual clutch pedal by depressing the latter through a comparatively small portion of its normal range, requiring very little effort in this operation, but yet resisting the movement of the clutch pedal with a slight pressure which is proportional to the pressure being exerted against the clutch itself by the power actuated device. This provides the operator with a sense of touch and permits him to feel what has taken place in the mechanism, as in an ordinary foot-operated clutch mechanism, but relieves him of all the strenuous work of disconnecting a large heavy clutch against a strong pressure spring.

As a matter of safety, it is desirable that in case of a failure in the power actuated equipment the clutch be disconnectible by manual force exerted by the operator, and to this end it is an object to control the power actuated clutch disconnecting device by the usual clutch pedal, by moving the latter through a small portion of its range, while the clutch can be disconnected manually by exerting a greater force on the clutch pedal and pushing the latter through the remainder of its range. This object is accomplished by providing a lost motion connection between the pedal and the clutch mechanism and connecting the control valve for the power actuated means to the clutch pedal, so that a small arc of movement of the pedal actuates the valve, but further movement of the pedal brings the lost motion connection into operation and permits the clutch to be disconnected manually. The overrun motion or one-way connection permits the power device to take the spring load from the foot pedal and move the clutch-actuating device away from the latter. Thus, the foot pedal itself is not moved away from the operator's foot by the power actuated device, so that when the operator releases the pedal, the clutch mechanism is returned to normal position.

A further object relates to the provision of a system in which the gear shift mechanism does not operate until after the clutch mechanism has been moved to disconnected position. This eliminates any possibility of the gears being shifted before the clutch is disconnected. It also permits the gear selector lever to be shifted at any time during operation of the vehicle without effecting any change until the clutch pedal is depressed by the operator, which thus initiates the execution of the change in gears.

Still another specific object relates to the provision of a gear selector valve mechanism having a gear shift lever operable through the conventional H-shaped pattern, the selector valve mechanism being simple and compact, but strong and durable.

A further object relates to the provision of a novel and improved fluid motor for shifting a control member, such as a gear shifting fork, in either of two opposite directions from a neutral position, and arranged to operate positively and accurately. In this connection, it is a specific object to provide a fluid motor which has a definite intermediate or neutral position into which it moves positively under full pressure but stops accurately in said neutral position and is definitely locked in all three operating positions as long as fluid pressure is maintained.

These and other objects and advantages of my invention will be apparent to those skilled in the art after a consideration of the following description, in which reference is had to the drawings appended hereto, in which Figure 1 is a diagrammatic lay-out of a fluid pressure control system embodying the principles of the present invention, certain parts being shown in section.

Figure 2 is a top plan view showing the gear shift control lever and the H-shaped guide therefor.

Figure 3 is a partial diagrammatic view similar to Figure 1, but showing a slightly modified form of the invention.

Figure 6 is a sectional elevational view taken along a line 6—6 in Figure 1, showing the construction of the selector valve and drawn to an enlarged scale.

Figure 7 is a front elevational view taken along a line 7—7 in Figure 6.

Figure 8 is a sectional elevational view similar to Figure 7 but showing the selector valve lever set in one of its operating positions.

Figure 9 is a sectional elevational view taken along a line 9—9 in Figure 6.

Figure 4:
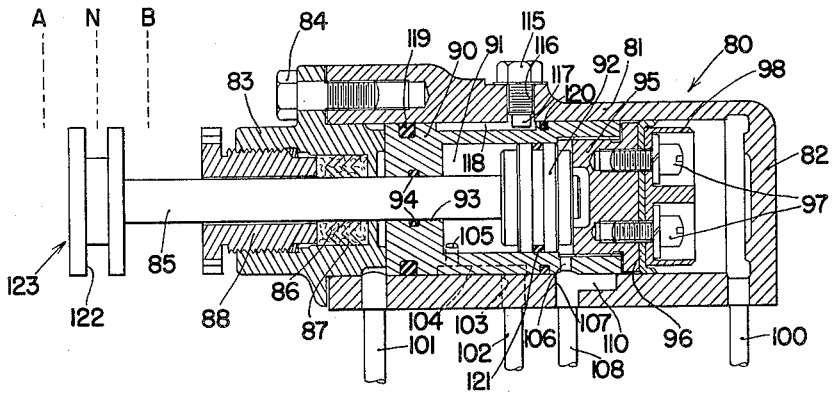
Figure 4 is a sectional elevational view of one of the fluid motors for shifting the gears, and drawn to an enlarged scale.

Referring now to the drawings, the clutch of the vehicle is of the type which is normally biased to engaged position by means of a strong spring, as is well-known to those skilled in the art, and therefore is not shown in the drawings. The clutch is disconnected by means of a clutch throwout rod 10 connected at one end to the clutch and at its other end to a short arm 11 by means of a pivot bolt 12. The arm 11 is rigidly fixed to a hub 13 which is mounted on a shaft 14 and has a bifurcated clamping section 15 which is clamped by means of a bolt 16 to tightly engage the shaft 14. A key 17 is interposed between the hub 13 and the shaft 14 to prevent relative rotation therebetween.

A clutch actuating lever 18 is mounted rigidly on a hub 19, which is journaled on the shaft 14 adjacent the hub 13 and is provided with a laterally extending lug 20, which is rigidly mounted on an arm 21 extending oppositely from the operating lever 18 and rigidly fixed to the hub 19. The lug 20 extends underneath a rearwardly extending arm 22, formed integrally with the hub 13, and which is provided with a pair of adjusting bolts 23, 24 which are disposed within vertically extending threaded openings 29 in the arm 22. Bolt 23 projects downwardly beneath the arm 22 and engages a floor plate 26 to limit the movement of the shaft 14 in a clockwise direction as viewed in Figure 1. The second bolt 24 projects downwardly beneath the arm 22 and engages the lug 20 when the latter is raised by a counterclockwise angular movement of the operating lever 18 about the axis of the shaft 14. A U-shaped spring strap member 27 is secured to the arm 22 by means of the bolts 23, 24, and is held tightly against the upper side of the arm by lock nuts 28, which also fix the adjusting bolts in adjusted position. The spring 27 curves downwardly and bears upon the top side of the lug 20, urging the latter downwardly out of engagement with the lower end of the bolt 24. A foot pedal 25 is provided on the outer end of the lever 18, as is the usual construction of clutch operating pedals.

The shaft 14 is urged in a clockwise direction by the clutch spring (not shown) acting to urge the clutch operating rod 10 toward the right, and thereby acting through the bolt 12 and arm 11 to force the arm 22 downwardly to maintain the bolt 23 in contact with the floor plate 26. Likewise, the U-shaped spring 27 presses downwardly on the lug 20 and thereby urges the clutch pedal arm 18 in a clockwise direction until the end of the arm 21 also engages the floor plate 26. A downward pressure upon the pedal 25 in opposition to the spring 27, moves the arm 21 upwardly until the lug 20 engages the lower end of the bolt 24, after which further downward pressure on the pedal 25 rotates the arm 22, hub 13, shaft 14, and arm 11, in a counterclockwise direction, thereby pulling the clutch rod 10 to the left, disconnecting the clutch against the pressure of its spring (not shown). Inasmuch as the pressure of the spring 27 is appreciably less than the pressure of the conventional clutch spring, the first portion of the arc of movement of the operating lever 18 is accomplished with very little pressure of the operator's foot upon the pedal 25, but after the lug 20 engages the bolt 24, it requires an appreciable effort on the part of the operator to continue the movement of the operating pedal against the opposition of the clutch spring.

The shaft 14 is rotated by a power actuated device in the form of a fluid pressure operated cylinder and piston assembly, indicated generally by reference numeral 35 and comprising a cylinder 36, within which is slidably disposed a piston 37 threaded on the end of a piston rod 38, which is pivotally connected by a crank pin 39 to a crank 40 rigidly fixed to the shaft 14. The cylinder 36 is preferably a single casting with a closed end 41 and a supporting ear 42, which is pivotally mounted by means of a pin 43 on a bracket 44, the latter being anchored on any suitable support. Hydraulic fluid, preferably oil, but which can be any suitable fluid adapted for the purpose and known to those skilled in the art, is introduced to the cylinder 36 near the head 41 through a duct 45. The pressure of the fluid moves the piston 37 toward the left in the cylinder 36, acting through the piston rod 38 and crank arm 40 to rotate the shaft 14 in a counterclockwise direction. The oil is confined between the piston 37 and the cylinder head 41 by means of a cup-shaped seal 46 secured to the piston by a nut 47 on the threaded end of the piston rod 38. The piston rod 38 extends out of the opposite end of the cylinder through a packing gland 48 disposed within a sealing cap 49 fixed to the cylinder by bolts 50, and the sealing gland 48 is maintained under compression by means of a bushing 51.

The hydraulic fluid is supplied to the cylinder by means of a pump 55 comprising a pair of intermeshing gears 56, one of which is mounted on a drive shaft 57 connected to any suitable prime mover, such as the engine of the vehicle. The gears 56 are disposed within a casing 58, the latter being provided with a reservoir portion 59 which contains the supply of oil or other fluid.

I do not intend my invention to be limited to the use of a liquid, for compressed air or other gas may be employed for actuating the piston and cylinder assembly 35 and the other mechanism to be described herein, without departing from the spirit or scope of my invention.

The fluid flows from the reservoir 59 to the pump through an inlet passage 60 and is carried by the gear teeth in a manner well-known to those skilled in the art and forced through a high pressure duct 61. The flow of oil from the duct 61 to the fluid motor 35 is controlled by a valve indicated generally by reference numeral 65. The valve 65 comprises a valve casing 66, within which is disposed a high pressure chamber 67 to which the oil flows from the duct 61 and is also provided with a lower pressure chamber 68, which is connected by a return duct 69 to the reservoir 59. The chambers 67, 68 are interconnected by means of a valve port 70, preferably cylindrical in shape and adapted to receive a valve plunger 71, the plunger 71 being slidable through the port 70 for closing off the latter and preventing oil from flowing therethrough to the low pressure chamber 68. The cylinder duct 45 is connected in communication with the high pressure chamber 67, but normally the oil flows from the pump 55 through the duct 61 into the high pressure chamber 67, and circulates through the normally open valve port 70, the low pressure chamber 68, and the return duct 69 back to the reservoir 59. When the valve plunger 71 is moved into the valve port 70, closing the latter against flow of oil, the oil then flows through the cylinder duct 45 to the cylinder 36 to force the piston 37 axially within the cylinder 36, thus disconnecting the clutch.

The valve plunger 71 extends downwardly through a sealing gland 72 out of the valve casing 66 and is pivotally connected by a pin 73 to a link 74, which is pivoted at 75 to the end of the arm 21. By proper adjustment of the bolt 24, the valve plunger 71 is moved into the valve port 70 by the first portion of the arc of travel of the clutch pedal 25, thereby causing the fluid motor 35 to disconnect the clutch by power obtained from the pump 55 as explained above, thereby relieving the operator from the necessity for further movement of the clutch pedal 25. However, should the fluid motor 35 fail to disconnect the clutch for any reason, such as a lack of pressure due to a break in the high pressure line 61 or any other reason, the operator can disconnect the clutch manually by continuing to move the clutch pedal 25 downwardly until the lug 20 engages the end of the bolt 24 and the shaft 14 is then rotated by force exerted by the operator upon the pedal 25. If the pedal 25 is depressed throughout its complete range, the valve plunger 71 merely slides upwardly through the high pressure chamber 67 to the extreme position indicated in dotted lines.

When the operator releases his foot from the pedal 25, the spring 27 returns it to normal position with the end of the arm 21 in engagement with the floor plate 26, in which position the valve plunger 71 is withdrawn from the port 70. This releases the oil from the high pressure chamber 67 and relieves the pressure in the cylinder 36, whereupon the pressure of the clutch spring against the operating rod 10 forces the piston 37 back toward the right in the cylinder and thus forcing the oil to return through the cylinder duct 45 to the valve casing 66, and from there through the return duct 69 to the reservoir 59.

It will be noted that when the valve plunger 71 enters the port 70, the pressure of the oil within the chamber 67 is imposed upon the end of the plunger 70 and requires a slightly increased pressure on the pedal 25 to hold the plunger in the valve port 70. This provides the operator with an indication that the fluid motor 35 is operating properly, and since the pressure on the end of the valve plunger 71 is proportional to the total pressure required to disconnect the clutch, the operator, through his sense of touch, obtains the same sensation that he would obtain by manual operation of the clutch, but on a smaller scale.

A duct 76 interconnects the cylinder 36 on the low pressure side of the piston 37 with the low pressure chamber 68 in the valve casing 66. This prevents any back pressure from building up behind the piston 37. A third duct 77 is connected with the cylinder 36 at an intermediate point therein, to conduct oil from the cylinder to operate the gear shifting fluid motor after the piston 37 has traveled over substantially a complete range within the cylinder 36, as will now be described.

Figure 5:
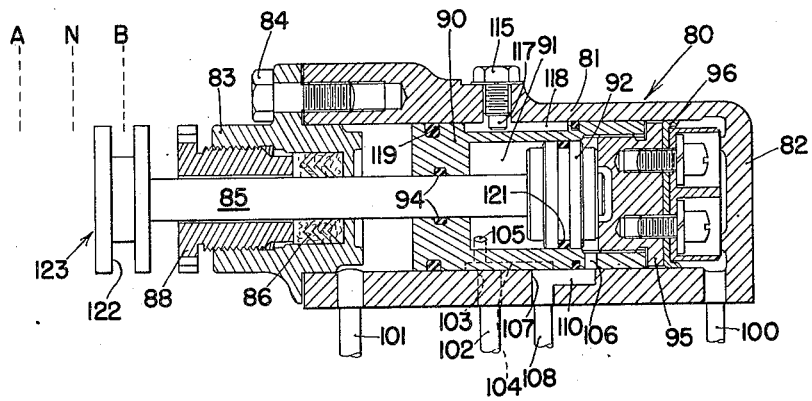
Figure 5 is a view similar to Figure 4 but shows the fluid pressure motor in a different position.

One of the gear shift fluid motors is indicated in its entirety by reference numeral 80, the details of which are best shown in Figures 4 and 5. The fluid motor 80 comprises an outer cylinder 81 having a closed head or end portion 82. The opposite end of the cylinder is closed by means of a sealing cap 83 secured by bolts 84 to the cylinder 81. A piston rod 85 extends outwardly through the cap 83 and is sealed against oil leakage around the piston rod 85 by means of a sealing gland 86 disposed within a recess 87 in the cap 83, and compressed therein by means of a suitable bushing 88. Slidably disposed within the cylinder 81 is an intermediate piston member 90 having a hollow interior portion 91, which serves as a cylinder for an inner piston 92. One end of the intermediate piston 90 is closed except for a cylindrical opening 93 adapted to receive the piston rod 85 slidably disposed therewithin. An annular seal 94 encircles the opening 93 and prevents leakage of oil between the inner cylinder 91 and the outer cylinder 81. The piston rod 85 extends through the outer and intermediate cylinders 81, 90 and is connected to the inner piston 92. The other end of the intermediate piston 90 is closed by means of a threaded plug 95, which screws into the end of the intermediate piston 90 in oil-tight relation. A cup-shaped sealing member 96 is mounted on the end of the plug 95 by means of a pair of studs 97, there being a cup-shaped washer 98 secured to the bolts 97 and serving as a bumper to engage the end 82 of the cylinder 81 and thus protect the cup-shaped seal 96.

Thus, it is evident that the fluid motor 80 comprises three telescopically arranged parts, the cylinder 81, the intermediate piston 90 slidable within the cylinder 81, and the inner piston 92 slidable within the cylinder 91 in the intermediate piston 90. In Figures 1 and 4 the parts are arranged in the positions indicated for neutral position of the fluid motor 80. In this position, the intermediate piston 90 is at the left end of its stroke within the cylinder 81 and is in abutment with the sealing cap 83, while the inner piston 92 is at the right end of its stroke within the cylinder 91 and is in abutment with the plug 95.

The parts are moved to this position by introducing oil under pressure through a cylinder duct 100 to the right and of the cylinder 81, thereby applying pressure to the right end of the intermediate piston 90. At the same time, the oil at the opposite end of the intermediate piston 90 is relieved from the cylinder 81 through a cylinder duct 101, connected in communication with the left end of the cylinder 81. The inner piston 92 is forced to the position shown by introducing oil under pressure through a cylinder duct 102, which communicates with a port 103 in the wall of the cylinder 81, which port is disposed in register with an axially extending groove 104 in the intermediate piston 90. A short passage 105 connects the groove 104 with the left end of the inner cylinder 91. Oil is relieved from the right end of the inner cylinder 91 through an aperture 106 in the intermediate piston member 90, which registers with a port 107 in the cylinder 81, to which a duct 108 is connected. A groove 110 extends axially toward the right in the cylinder 81 from the port 107. The grooves 104 and 110 insure that the cylinder ducts 102 and 108 are always connected in communication with the inner cylinder 91, on opposite sides of the inner piston 92, respectively. Groove 104 and port 103 are spaced peripherally from groove 110 and port 107, so that there is no communication therebetween when the parts are in the positions shown in Figure 5. The intermediate piston member 90 is prevented from rotating within the cylinder 81 by means of a stud 115 disposed in threaded engagement within a hole 116 in the cylinder 81 and having an end portion 117 of reduced diameter, which projects into the cylinder 81 and is slidably received within a narrow groove 118 extending axially along the outer surface of the intermediate piston member 90. The projection 117 engages the groove 118 to hold the fluid passage or groove 104 in register with the port 103 and also holds the port 106 in register with the groove 110.

A pair of annular resilient sealing members 119, 120 are disposed in grooves which extend around the circumference of the intermediate member 90 at opposite ends of the groove 104 and prevent leakage of oil between the ports 103, 107 and the interior of the cylinder 81. The inner piston 92 is also provided with an annular seal 121 to prevent any flow of fluid between the piston 92 and the wall of the cylinder 91.

In the position shown in Figure 4, the fluid motor 80 is disposed in neutral position, as indicated by reference letter N in register with the groove 122 in the coupling member 123 at the end of the connecting rod 85. Thus, in neutral position the intermediate piston 90 is at the left end of its stroke and the inner piston 92 is at the right end of its stroke. Now, to shift the coupling member 123 of the fluid motor to the operating position indicated by reference letter B, oil under pressure is applied to the left end of the intermediate piston 90 through the cylinder duct 101, thus forcing the intermediate piston 90 toward the right until the member 98 engages the end wall 82. At the same time, oil is maintained under pressure in the cylinder duct 102, which pressure is transmitted through the port 103, groove 104, and opening 105, to the oil within the inner cylinder 91, and hence holds the inner piston 92 rigidly against the end plug 95. Thus, there is no movement of the inner piston 92 relative to the intermediate piston 90, but both move as a unit toward the right within the outer cylinder 81 until they reach the position shown in Figure 5.

To move the fluid motor to the position indicated A from the neutral position in Figure 4, oil is supplied under pressure through the cylinder duct 108 and flows through the port 107, groove 110 and port 106 into the inner cylinder 91 on the right hand side of the piston 92, forcing the latter toward the left to place the coupling member 123 in alignment with the position indicated A. While the piston 92 is moving, the oil on the opposite side of the latter is forced outwardly through opening 105, groove 104, port 103, and cylinder duct 102. During this movement, the intermediate piston 90 is maintained in rigid abutment against the cap 83 by maintaining pressure within the cylinder 81 on the right end of the intermediate piston 90, through the cylinder duct 100.

To return the coupling member 123 to neutral, oil is forced through cylinder duct 102, groove 104, and opening 105 into the inner cylinder 91, while the oil from the opposite side of the piston 92 is allowed to flow outwardly through the opening 106 and port 107 into duct 108, and at the same time maintaining pressure against the end of the intermediate piston 90 through the cylinder duct 100. Thus, it is evident that every movement of the fluid motor from neutral to any position, or back to neutral again, is a positive movement of parts under full oil pressure, into abutment with rigid stops. There is no possibility for the fluid motor to overshoot its mark or to stop in any indeterminate position, and when the parts reach the predetermined position, they are locked therein by full pressure of the hydraulic fluid.

When moving from one operating position A to the other operating position B, there is no necessity for the parts to stop at the neutral position N, for in this case the oil pressure is maintained on both cylinder ducts 101, 102, thereby shifting the intermediate piston 90 to the right within the cylinder 81, and at the same time shifting the inner piston 92 to the right within the inner cylinder 91, while cylinder ducts 100, 108 are relieved to allow the oil to flow out of the outer and inner cylinders from the right side of the pistons. Likewise, when shifting from position B to position A, oil is supplied to ducts 100 and 108 under pressure, while ducts 101, 102 are relieved. This shifts the inner piston 92 to the left within the inner cylinder 91, simultaneously shifts the intermediate piston 90 to the left within the cylinder 81.

As indicated in Figure 1, the coupling member 123 engages an ear 124 on a shifting fork member 125, the ear 124 resting within the groove 122. The shifting fork member is regidly fixed to a shift rod 126, which is slidable axially in a manner well-known to those skilled in the art. The rod 126 is one of a set of three rods 126, 127, 128, in the illustrated embodiment, the number of rods and shifting fork members 125 being dependent on the design of the transmission mechanism, which is not a matter of concern in the present invention. Each of the shift rods 126, 127, 128 is provided with a separate fluid motor 80 for driving the same, or one or more of the rods can be shifted by manual means while the remainder are provided with fluid motors for shifting the same. In order to simplify the present disclosure, only one of the fluid motors is shown, inasmuch as the other fluid motors are of identical design.

As indicated hereinbefore, fluid is supplied under pressure for operating the fluid motor 80, through a supply duct 77, which receives oil from the clutch operating cylinder 36, after the clutch operating piston 37 has traveled over substantially a complete range within the cylinder 36. This insures that no movement of the gear shifting mechanism is made until after the clutch is disconnected, and also prevents the clutch from engaging during the time that the gear shifting mechanism is active in shifting the gears. The oil from the supply duct 77 is distributed to the proper cylinder ducts by means of a selector valve mechanism, indicated generally by reference numeral 130, which valve also connects the proper cylinder ducts to a return conduit 131, which conveys the return oil back to the low pressure chamber 68 of the valve 65.

The selector valve 130 comprises a valve casing 132, within which are disposed a plurality of vertically slidable valve plungers which control the flow of oil to and from the fluid motor 80, associated with the shift fork 125 and shift rod 126. The same selector valve 130 also controls the fluid motor (not shown), which is associated with the shift rod 127. One pair of valve plungers 135, 136 control the flow in the cylinder ducts 100, 101, 102, 108 connected with the fluid motor 80, while a second pair of valve plungers 137, 138, controls a similar set of cylinder ducts 100', 101', 102' and 108', leading to the other fluid motor (not shown).

The valve casing 132 is composed of three juxtaposed sections 139, 140, 141, which are manufactured as separate parts for convenience in manufacturing, but which are rigidly bolted together by four bolts 142, which extend through aligned openings in the several sections and secure the same together to provide a single unitary casing. The supply duct 77 is connected with a port 145 in the center section 140 of the valve case. This port 145 communicates with a distributing duct 146 which extends vertically within the center casing section 140 on one side of the center line thereof. A second distributing duct 147 extends vertically through the center section 140 on the opposite side of the center line, as best shown in Figure 6. Upper and lower communicating ducts 148 extend in opposite directions from the two high pressure distributing ducts 146, 147 and connect the latter in communication with a plurality of high pressure compartments 149 in the outer sections 139, 141. These compartments 149 are preferably cored out of the cast casing sections 139, 141, while the passages 146, 147, 148 are drilled in the center casting 140. Thus, the compartments 149 extend inwardly from the inner surface of the casting sections 139, 141 and are closed along their inner sides by the faces of the center casting 140. Gaskets 150 are interposed between the casing sections to prevent leakage of oil therebetween.

The center casing section 140 is provided with a drilled passage 155 extending downwardly from the top of the section on the center line of the latter, the opening at the upper end of the section being closed by a plug 156. The passage 155 is connected by a communicating duct 157, disposed perpendicular thereto, with a pair of low pressure compartments 158 disposed in the two outer sections 139, 141, respectively. The chamber 158 in one of the sections 139 is connected in communication with the return duct 131. Both of the high pressure compartments 149 and the low pressure compartment 158 in each of the casing sections 139, 141 extends across the entire width of the latter and the low pressure compartment 158 is substantially midway between the vertically spaced high pressure compartments 149. Intermediate between the low pressure compartment 158 in each casing section and the high pressure compartment 149 above and below the latter, are two pairs of valve compartments 160, 160' and 161, 161'. The pair of compartments 160, 160' are disposed in horizontal alignment with each other but are not connected together. Compartment 160 is connected to cylinder duct 100 on the front side of the valve, while compartment 160' is connected with cylinder duct 100' on the rear side of the valve. Similarly, compartment 161 is connected in communication with cylinder duct 101 while compartment 161' is connected with cylinder duct 101' on the rear side of the valve, the compartments 161, 161' being separate compartments but on the same horizontal level. Likewise, in valve casing section 139, are similar compartments 160, 160' and 161, 161' above and below the low pressure compartment 158 and on the same level with the corresponding compartment in casing section 141 described above, but are not connected therewith. These compartments are connected with cylinder ducts 102, 102' and 108, 108', respectively.

Each of the valve plungers 135, 136, 137 and 138 is slidably disposed within a vertically extending cylindrical passage 165, which interconnects the several compartments 149, 158, 160, 161 in the two outer valve casing sections 139, 141. Each of the valve plungers is cylindrical and fits closely within the passage 165 but slidable therein, preventing oil from flowing through the passage 165 past the plungers. Each of the plungers, however, is provided with two portions 166, 167 reduced in diameter to permit flow of oil from one compartment to another. In the normal position of the valve plungers, the upper reduced portions 166 interconnect the high pressure chambers 149 with the ducts 100 and 102, leading to the right side of the intermediate piston 90 and to the left side of the inner piston 92, respectively, holding the fluid motor 80 in the position shown in Figures 1 and 4. The lower reduced portions 167 on the valve plungers 135, 136 connect the low pressure compartments 158 with the ducts 101, 108 leading to the left end of the main cylinder and to the right end of the inner cylinder, respectively. A similar connection is made with the rear pair of valve plungers 137, 138, associated with the fluid motor (not shown) connected to the other shifting rod 127.

When one of the valve plungers, such as 136 in Figure 8, is depressed to its lower limit of travel, the pressure on the cylinder ducts is reversed. For instance, when the valve plunger 136 is depressed to its lower limit, cylinder duct 100 is disconnected from the high pressure chamber 149 and is connected with the low pressure compartment 158, while cylinder duct 101 is disconnected from the low pressure compartment 158 and connected with the high pressure compartment 149, thereby shifting the intermediate piston 90 to the right end of its stroke.

The valve plungers 135, 136, 137 and 138 are each provided with a lower end portion 168 of greater diameter than the remainder of the plunger. This portion 168 of the plunger is movable within a lower portion 169 of the vertical cylindrical opening 165 which is enlarged in diameter, and the plunger is urged upwardly by a compression spring 170 until the portion 168 of greater diameter engages the upper end of the enlarged opening 169, which is the normal position of the plunger. Each of the springs 170 reacts against a plug 171, which is screwed into the lower end of the enlarged opening 169. Each of the plugs 171 has a projection 172 at its inner end, which extends inside of the spring coil 170 and is adapted to engage the lower end of the valve plunger to serve as a stop as the plunger moves downwardly, and thus determines the lower limit of its movement, see Figure 8.

A pair of low pressure compartments 175, 176 are disposed in each of the outer sections 139, 141 of the valve casing and serve to retain any oil that leaks past the valve plungers, returning the oil through upper and lower ducts 177 to the low pressure passage 155 in the center section 140. An oil seal 178 encircles each of the valve plungers and is set within a recess 179 in the top of the valve casing.

The lower end of the high pressure distributing passage 146 is drilled to a larger diameter at 180 and contains an excess pressure relief valve in the form of a ball 181 urged against the lower end of the passage 146 by means of a compression spring 182. The spring reacts against a plug 183 which is threaded into the lower end of the opening 180. A drilled passage 184 connects the chamber 180 with the low pressure duct 155. The spring 182 is of sufficient strength to hold the ball valve 181 closed under normal operating pressures, but yields to dangerously high pressures and permits the oil from the high pressure duct 146 to escape to the low pressure duct 155.

The lower end of the other high pressure duct 147 is also drilled to a larger diameter to provide a compartment 185, within which is disposed a valve 186 which seats against the lower end of the passage 147, but which can be opened manually to provide a by-pass. The valve 186 is mounted on a valve rod 187, the latter being threaded to engage a bushing 188 which is threaded into the lower end of the compartment 185. By opening the by-pass 186, the gear shifting mechanism is disabled for any purpose such as to permit hand operation. Normally, however, the valve 186 is maintained in closed position. The enlarged portion 185 is connected by the transverse passage 184 to the low pressure duct 155.

The two valve plungers 135, and 136, associated with the fluid motor 80, are controlled by a rockable control member 190 comprising a hub 191 rockably journaled on a shaft 192 disposed in a horizontal position between the two valve plungers 135, 136. Integrally formed with the hub 191 are a pair of oppositely extending presser arms 193, 194 disposed in engagement with the upper ends of the valve plungers 135, 136, respectively. When the control member 190 is rocked in one direction, as shown in Figure 8, the end 194 engages the upper end of the valve plunger 136 and depresses the latter, while the other valve plunger 135 is held in normal position by the spring 170, and limited by the enlarged lower portion 168 engaging the upper end of the enlarged opening 169. As stated above, this reverses the oil pressure on the intermediate piston 99 and shifts the latter to right from the position shown in Figure 4 to the position shown in Figure 5. Since the other valve plunger 135 is in neutral position, the pressure remains unchanged on the inner piston 92, whereupon the latter remains at the right end of its stroke. By shifting the rockable control member 190 back to neutral position, the plunger 136 is restored to its normal position, thereby restoring the pressure upon the right end of the intermediate piston 90 and returning the latter to the position shown in Figure 4. By rocking the control member 190 in the opposite direction, the valve plunger 135 can be depressed, thereby reversing the oil pressure on the inner piston 92, shifting the latter to the left from neutral position to position A.

A second rockable control member 190' comprises a hub 191' journaled on the shaft 192 in spaced relation to the hub 191 and is provided with a pair of oppositely extending arm 193', 194' which engage the upper ends of the valve plungers 137, 138, associated with the other gear shifting fluid motor (not shown). The operation of the second fluid motor is similar to the operation described above in connection with the fluid motor 80. A supporting block 196 is journaled on the shaft 192 between the two control members 190, 190' and is also rockable thereon. A bifurcated control lever 197 has a pair of legs 198, which straddle the block 196 and are pivotally mounted thereon by means of a pivot bolt 199, passing through aligned apertures in the legs 198 and block 196, providing for rocking movement of the lever 197 about the axis of the bolt 199, which is substantially perpendicular to the axis of the shaft 192 and spaced below the latter. A control lever 197 is provided with a pair of oppositely extending dogs 200, 200', which can be shifted into cooperative notches 201, 201' in the two control members 190, 190', respectively. Thus, by shifting the control lever 197 to the right as viewed in Figure 6, the dog 200 can be engaged with the notch 201, and then the lever can be shifted in either direction about the axis of the shaft 192 to rock the control member 190 in either direction to operate the valve plungers 135, 136, selectively. Similarly, the lever 197 can be rocked to the left about the axis of the bolt 199, to engage the dog 200' with the notch 201', after which the lever can be shifted about the axis of the shaft 192 to rock the control member 190' for the purpose of depressing either the plungers 137 or 138, selectively.

The shaft 192 is journaled in a pair of bearings 202 disposed in oposite ends of a casting indicated generally by reference numeral 203, which is provided with a pair of feet 204 which are rigidly mounted on the top of the center section 140 of the valve casing 130 and secured thereto by studs 205. The member 203 has a pair of walls 206 extending upwardly from the two bearings 202 and the walls 206 are interconnected by a dome-shaped top portion 207, which is slotted to provide an H-shaped guide for the control lever. The bifurcated portion 197 of the control lever terminates beneath the dome 207 and is slidably received within a tubular member 208 which is disposed in telescopic relation thereto. A handle 209 is fixed to the upper end of the tubular portion 208, and the latter is beveled at 210 to provide a conical surface adapted to be received within tapered recesses 211 disposed in the under side of the dome 207 at the ends of the various branches of the H-shaped slot 212 and at the center of the latter. The conical surface 210 is urged into seating engagement with the recesses 211 by means of a compression spring 213 disposed within the telescoping members 197, 208 and adapted to urge the handle 209 upwardly. By first pressing the handle 209 downwardly, the conical portion 210 is unseated from the conical recess 211, after which the handle 209 may be shifted within the H-shaped slot 212, but when the handle 209 is released, the spring 213 forces the conical portion 210 upwardly into seating engagement with the recess 211 at that position.

As in the conventional automobile gear shift mechanism, the handle 209 is in neutral position when it is in the center of the H-shaped slot 212, as shown in Figure 2, as well as in Figures 6, 7 and 9. The fluid motor 80 is controlled by depressing the handle 209 in the position shown in Figure 2 and moving it downwardly into the slot at the lower part of Figure 2 after which the handle can be moved to the right or left to depress the valve plungers 136 or 135, selectively. By moving the handle to the upper portion of the H-shaped slot, as viewed in Figure 2, the handle 209 is connected with the other control member 190', after which the handle can be moved to the right or left to depress the valve plungers 138 or 137, selectively, to control the fluid motor (not shown), associated with the shifting rod 127.

The third shifting rod 128 in the embodiment shown in Figure 1, is preferably shifted by a suitable manual shifting means to obtain the first or lowest speed connection of the transmission gears and also the reverse connection. The position indicated at A in Figure 2 corresponds with position A of the gear shift fork 125, which is the second speed connection. Position B in Figure 2 corresponds to position B of the shift fork 125, which is the third speed connection. Positions C and D correspond to the positions of the fluid motor which is not shown, associated with shifting rod 127 and provide a fourth and fifth speed connection.

When shifting from one gear connection to another, it is desirable that the transmission be first shifted to neutral before the new gear combination is set up, in order to prevent clashing or stripping of the gears of the transmission. This can, of course, be accomplished by first shifting the handle 209 to the neutral position N at the center of the H-slot 212, then actuating the clutch pedal 25, and then shifting the handle 209 to the new position, but it is preferable that the handle 209 be shifted from any position to any other position directly without the intermediate neutral position, in order that the new gear combination be pre-selected before the clutch pedal 25 is actuated. For this purpose, an interlock, indicated by reference numeral 215, is provided between the three shift rods 126, 127, 128. Since interlock mechanisms of this type are known to those skilled in the art, a complete description is not considered necessary here, but is merely shown in diagrammatic form in Figure 1. The mechanism 215 comprises a pair of vertically disposed interlock bars 216, 217 mounted on blocks 218, 219, respectively, which are slidable laterally in a groove between guides 221, preventing movement parallel to the rods. The vertical edges of the bars 216, 217 are each beveled and are adapted to fit into V-shaped notches 220 in each of the rods 126, 127, 128, which are in alignment with the bars when the latter are in their neutral position. The interlock bars 216, 217 permit only one of the rods to be shifted at a time. As shown in Figure 1, the rod 128 is in shifted position, with the notch 220 out of engagement with the interlock bar 217. The edge of the latter engages the cylindrical surface of the rod 128, forcing the bar 217 into the notch 220 in rod 126, and the block 219 fixed to the lower end of bar 217 engages block 218 to force bar 216 into the notch 220 in rod 127. Thus, since the blocks 218, 219 are prevented from moving longitudinally of the rods, the rods 127 and 126 are prevented from longitudinal shifting movement as long as rod 128 is in a shifted position. When rod 128 is shifted back to neutral, its notch 220 is then disposed in alignment with the bar 217, and permits the latter to move into the notch 220 in rod 128, releasing the opposite edge of the bar 217 from the notch 220 in rod 126. This releases the rod 126 for shifting movement in either direction by the fluid motor 80, since the other interlock bar 216 in engagement with the notch 220 in rod 127, is released from the notch in rod 126. In this position of the bar 216, however, the rod 127 is prevented from longitudinal shifting movement, so that when the handle 209 is shifted from position A or B to position C or D, and the clutch pedal 25 is depressed to initiate a shifting operation, the selector valve 130 is positioned to return the fluid motor to neutral position, but is also positioned to depress one of the valve plungers 137, 138 and thereby directing oil to the other fluid motor (not shown). The latter, however, is prevented from movement by the bar 216 engaging the shift rod 127, therefore the oil flows only to fluid motor 80, shifting the latter to neutral position, but as soon as the latter reaches neutral position, the interlock bar 216 is forced out of engagement with the shift rod 127 and into the notch 220 in rod 126, by force exerted against the rod 127 by its associated fluid motor, after which the latter is free to shift its shifting rod 127 to the new gear combination.

The control system described herein relieves the operator from all the effort necessary to shift the gears and actuate the clutch, except for a slight pressure on the clutch pedal which is desirable to permit him to feel the pressure as the clutch and gears are being actuated. As soon as he removes his foot from the pedal 25, the presure is relieved through the port 79 in the valve casing 65, thereby relieving the pressure from all parts of the system during normal operation in any gear combination.

During such normal operation, the shift rods 126, 127 and 128 are each held in adjusted position by detent means in the form of a ball 225, which is urged into one of a plurality of grooves 226 in the end of the associated shift rod, by means of a compression spring 227 within a drilled passage 228 in a portion of the transmission housing, indicated diagrammatically at 229.

In order to prevent the gears from being shifted too suddenly and with too much force and thus to prevent gears from being damaged by the hydraulic shifting mechanism, each pair of cylinder ducts is interconected by a spring backed relief valve, which is provided with a spring of sufficient strength that it permits a normal pressure against the gear shifting piston associated therewith, but yields to an oil pressure slightly in excess of the normal pressure required to shift the gears. Inasmuch as each pair of gears in the transmission requires a different normal pressure for shifting the same, separate relief valves are provided for each combination. In Figure 1, it will be seen that the cylinder ducts 100, 101 at opposite ends of the intermediate piston 90 are interconnected by a passage 230, within which is disposed a spring check valve 231, which is adapted to yield when the oil pressure in the duct 101 exceeds a normal pressure for shifting the fork 125 from the neutral position N to the position B. It is not necessary to provide a yieldable valve for limiting the oil pressure in cylinder duct 100 when the gears are disconnected by shifting the intermediate piston 90 and thus the shifting fork 125 back to the neutral position. Of course, the main excess pressure relief valve 181 stands ready at all times to relieve the pressure in the entire system in case of any abnormal breakage or jamming of the mechanism.

In a similar manner, the two cylinder ducts 102, 108 are interconnected by a passage 232, within which is disposed a spring backed relief valve 233 which is adapted to limit the pressure in duct 108 during the shifting of the fork 125 to the position A. Separate valves 231, 233 are provided for the two different gear combinations, for a greater pressure is required to connect the heavier low speed gears than is required for the lighter high speed gears.

Referring now more particularly to Figure 3 in which the parts are indicated by the same reference numerals of the corresponding parts in Figure 1, to which have been added the suffix "a," it will be noted that in this embodiment of the invention, the main supply duct 77a is not connected to the clutch cylinder 35a, but is connected with the high pressure chamber 67a to receive oil directly therefrom, but through a valve port 235 which is interposed between the high pressure chamber 67a and the supply duct 77a. A poppet valve 236 is normally held in closed position in the port 235 by means of a compression spring 237, which opposes the pressure of the oil within the chamber 67a. The spring 237 is sufficiently strong to hold the valve 236 closed against the pressure required in the chamber 67a to actuate the clutch operating cylinder 35, but when the piston reaches the end of its stroke in the cylinder 36a, the pressure immediately increases and unseats the valve 236 against the pressure of the spring 237, thereby allowing the oil to flow through the supply duct 77a to the selector valve 130. The valve 236 insures that the clutch has been completely released before the oil pressure is supplied to the gear shifting cylinders.

I do not intend my invention to be limited to the exact details shown and described herein except as set forth in the claims which follow.

I claim:

1. Selector valve control means, comprising: a support having a pair of upstanding spaced apart ears apertured in alignment to provide a pair of coaxial mounting members; a shaft carried at its opposite ends in said members; a pair of rocker arms spaced apart axially on the shaft and rockably carried by the shaft between said members; means on each arm providing an upstanding notched lug, said lugs being aligned with respect to a plane passed through and including the shaft axis; a lever base member carried by the shaft between the spaced apart rocker arms for rocking about the shaft axis; means on said lever base member providing a pivot axis normal to the shaft axis and centrally between the rocker arms; a lever handle member normally upstanding from the base member in a central position and connected thereto on said last named pivot axis for rocking of said handle member and base member together in a plane normal to and about the shaft axis and for rocking of the handle member with respect to said base member in a plane axially of said shaft; and a pair of projections on the lever handle member, one at each side thereof, extending in opposite directions axially of the shaft respectively toward the notched lugs on the rocker arms and disengaged from said lugs when the lever handle member is in its normal central position but selectively engageable with said lugs when the lever handle member is rocked as aforesaid with respect to the lever base member.

2. Selector valve control means, comprising: a support having a pair of upstanding spaced apart ears apertured in alignment to provide a pair of coaxial mounting members; a shaft carried at its opposite ends in said members; a pair of rocker arms spaced apart axially on the shaft and rockably carried by the shaft between said members; means on each arm providing an upstanding notched lug, said lugs being aligned with respect to a plane passed through and including the shaft axis; a lever base member carried by the shaft between the spaced apart rocker arms for rocking about the shaft axis; means on said lever base member providing a pivot axis normal to the shaft axis and centrally between the rocker arms; a lever handle member normally upstanding from the base member in a central position and including upper and lower vertically telescopic parts, the lower part of which is connected to the base member on said last named pivot axis for rocking of said handle member and base member together in a plane normal to and about the shaft axis and for rocking of the handle member with respect to said base member in a plane axially of said shaft; a pair of projections on the lever handle member, one at each side thereof, extending in opposite directions axially of the shaft respectively toward the notched lugs on the rocker arms and disengaged from said lugs when the lever handle member is in its normal central position but selectively engageable with said lugs when the lever handle member is rocked as aforesaid with respect to the lever base member; a plate-like element carried rigidly on the aforesaid ears and extending in a plane generally normal to the principal axis of the lever handle member and formed with slots in accordance with the rocking movement of said handle member both with and with respect to the lever base member, said plate having a portion defining a central position for the lever handle member; spring means extensible between the upper and lower handle parts for resiliently urging the upper handle part upwardly; and means on said upper handle part engaging the plate-like element for retaining the handle member in selected positions in the aforesaid slots, said last named means being also engageable with the aforesaid plate portion for retaining the handle member in its central position.

EMIL F. JIRSA.

REFERENCES CITED

The following references are of record in the file of this patent:

UNITED STATES PATENTS

| Number | Name | Date |
|---|---|---|
| 954,492 | Zelle | Apr. 12, 1910 |
| 1,805,120 | Von Erhardt | May 12, 1931 |
| 1,823,590 | Christensen | Sept. 15, 1931 |
| 1,845,797 | Kearney | Feb. 16, 1932 |
| 1,876,249 | Krenzke | Sept. 6, 1932 |
| 1,991,124 | Sharpe | Feb. 12, 1935 |
| 2,043,314 | Wemp | June 9, 1936 |
| 2,075,917 | Vorech | Apr. 6, 1937 |
| 2,079,684 | Church | May 11, 1937 |
| 2,181,532 | Hill et al. | Nov. 8, 1939 |
| 2,220,673 | Bloomheart | Nov. 5, 1940 |
| 2,251,293 | Schwartz | Aug. 5, 1941 |
| 2,265,260 | Argo | Dec. 9, 1941 |
| 2,277,454 | Porsche | Mar. 24, 1942 |
| 2,328,849 | Schoelm | Sept. 7, 1943 |
| 2,329,742 | Bush | Sept. 21, 1943 |
| 2,336,715 | Casler | Dec. 14, 1943 |
| 2,345,224 | Upp | Mar. 28, 1944 |

FOREIGN PATENTS

| Number | Country | Date |
|---|---|---|
| 140,336 | Great Britain | Mar. 25, 1920 |